Jan. 30, 1962   J. B. O'HARA   3,019,089
PRODUCTION OF BORON TRICHLORIDE
Filed Jan. 19, 1956
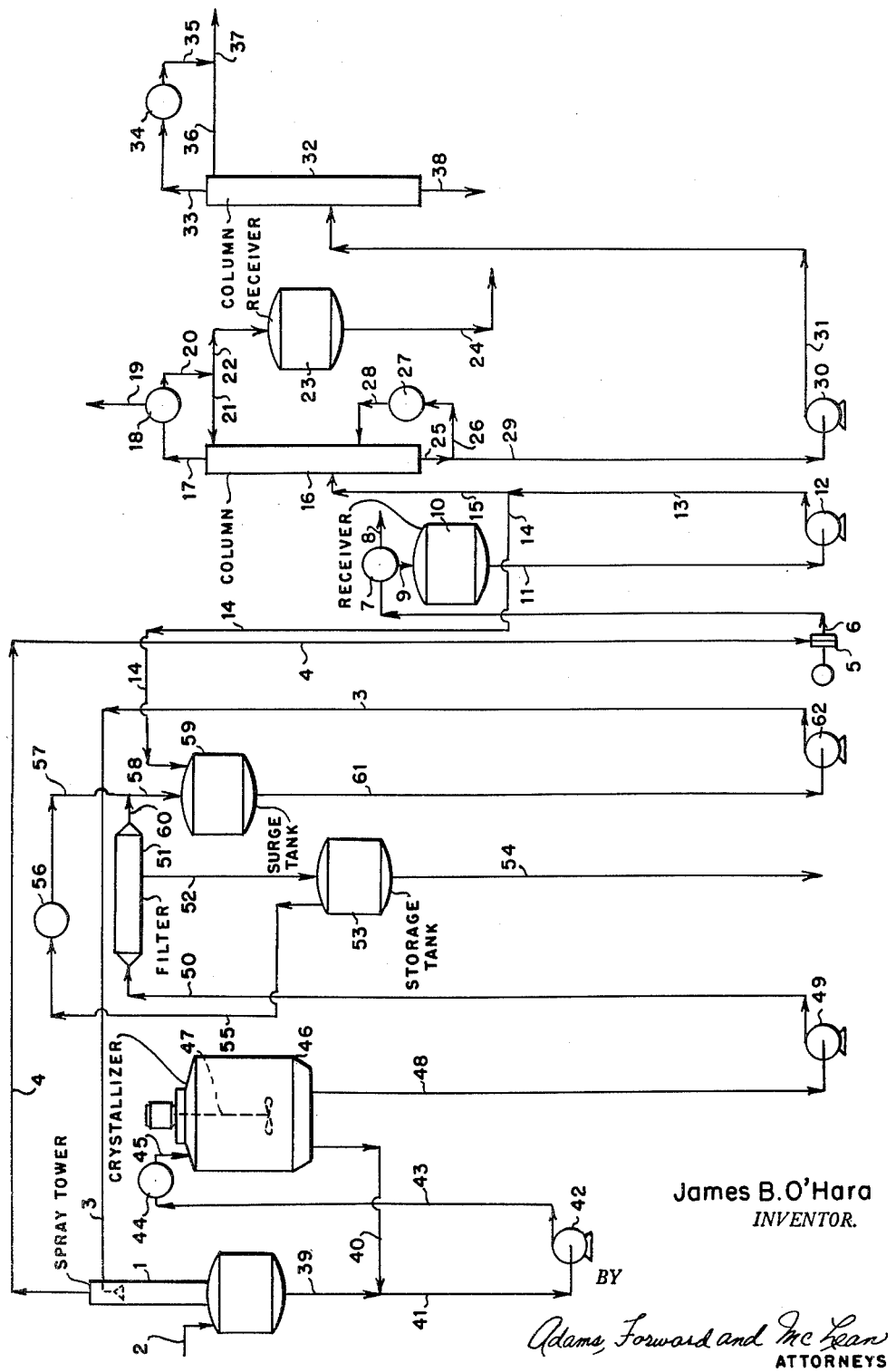
James B. O'Hara
INVENTOR.
BY Adams, Forward and McLean
ATTORNEYS

United States Patent Office 3,019,089
Patented Jan. 30, 1962

3,019,089
PRODUCTION OF BORON TRICHLORIDE
James B. O'Hara, Kenmore, N.Y., assignor, by mesne assignments, to Olin Mathieson Chemical Corporation, a corporation of Virginia
Filed Jan. 19, 1956, Ser. No. 560,104
3 Claims. (Cl. 23—205)

This invention relates to the production of boron trichloride.

It has heretofore been proposed to produce boron trichloride by reacting chlorine, an oxygen-containing boron compound and carbon at elevated temperatures. Among the oxygen-containing boron compounds suitable are boron trioxide (boric oxide), boric acids such as orthoboric acid, metaboric acid and tetraboric acid, and borates, such as sodium metaborate and sodium tetraborate. As the source of carbon, metallurgical coke, petroleum coke and furnace black can be employed. The reaction temperature can vary widely, generally being within the range from about 500° C. to about 1200° C.

When the process just described is carried out, the boron trichloride-containing effluent from the reaction vessel is at a high temperature and must be cooled. It is found that, upon cooling, solid deposits, which consist principally of a boron trichloride-boric oxide complex, are deposited upon heat exchanger surfaces and as a result those surfaces do not function properly over an extended period of time. It is the object of the present invention to provide a means whereby this difficulty can be avoided.

Thus, in accordance with this invention, it has been discovered that the formation of undesirable deposits upon cooling the hot effluent gas stream from the reactor can be avoided by contacting the hot effluent gas stream containing the boron trichloride with a spray of liquid which essentially comprises boron trichloride. Generally, the hot boron trichloride-containing gaseous mixture is subjected to the spraying operation before it has been cooled below about 250° C. The liquid employed in the spraying procedure can contain minor amounts of materials in addition to boron trichloride. Such materials can be boric oxide or chlorine. In a particularly advantageous embodiment, the liquid employed in the spraying operation will contain from 75 to 95 percent by weight of boron trichloride, from 5 to 15 percent by weight of boric oxide and from about 2 to 10 percent by weight of chlorine.

The following example illustrates in detail one embodiment falling within the scope of this invention and is to be considered together with the accompanying drawing.

*Example*

A mixture is made of the following ingredients in the following proportions by weight: boric acid, 2250; boric oxide, 47.4; carbon black, 843; starch, 125; and water, 530. This mixture is then passed to a briquetting machine wherein the starch-water binder, boric acid and carbon are compacted into dense briquettes. These "green" briquettes are then baked in a furnace at approximately 1,000° F. Following this, the briquettes at the rate of 2085 pounds per hour are fed into the top of a chlorination furnace which is maintained at a temperature of approximately 1050° F. and into the bottom of which chlorine gas is introduced at the rate of 4034 pounds per hour. From the top of the chlorination furnace a gaseous mixture having a temperature of about 1,000° F. is removed, this mixture being composed of the following materials removed at the following rates in pounds per hour: boric oxide, 24; chlorine, 560; boron trichloride, 3795; carbon monoxide, 1360; and phosgene, 29. This mixture is then passed through a water cooled heat exchanger wherein its temperature is reduced to 572° F. The cooled mixture is then processed as shown in the accompanying drawing.

In the drawing, the numeral 1 represents a conventional spray tower, into which the cooled, crude boron trichloride, prepared as just described, is introduced by means of line 2 into the bottom of spray tower 1, and through line 3 there is introduced a liquid mixture of the following materials at the following rates in pounds per hour: boric oxide, 10,800; chlorine, 6643; and boron trichloride, 98,858. The mixture passing through line 3 has a temperature of 5° F.

From the top of spray tower 1 by means of line 4 there is removed a gaseous stream composed of the following materials at the following rates in pounds per hour: chlorine, 795; boron trichloride, 5653; carbon monoxide, 1361; and phosgene, 43. The mixture of gases passing through line 4 has a temperature of 25° F.

From line 4 the crude boron trichloride is introduced into compressor 5, wherein the temperature of the gas is raised to 260° F. and wherein its pressure is raised from approximately atmospheric to 50 p.s.i.g. From compressor 5, through line 6, the gas passes to crude product condenser 7, operated at a temperature of approximately −50° F. Uncondensed gases are vented by means of line 8 for appropriate disposal and liquid passes from condenser 7 through line 9 into crude product receiver 10. From this receiver, the crude, liquid boron trichloride passes through line 11 and into pump 12. This crude liquid boron trichloride is composed of the following materials flowing at the following rates in pounds per hour: chlorine, 705; boron trichloride, 5573; and phosgene, 43.

From pump 12 the crude boron trichloride passes through line 13, which divides into lines 14 and 15. Through line 15 the chlorine, boron trichloride and phosgene pass at the rate of 470, 3715 and 29 pounds per hour, respectively, and this mixture is introduced into distillation column 16. Overhead from column 16 passes through line 17 and into condenser 18, from which uncondensed gases are removed by means of line 19 for appropriate disposal and from which liquid passes by means of line 20. Reflux is returned to column 16 by means of line 21 and through line 22 there passes a mixture of the following materials in the following rates in pounds per hour: chlorine, 470 and boron trichloride, 5. This stream has a temperature of +40° F. and is at a pressure of approximately 50 p.s.i.g. The stream passing through line 22 enters liquid chlorine receiver 23 and by means of line 24 and associated equipment is introduced into the reaction vessel wherein the boric oxide and carbon are reacted to produce the desired boron trichloride.

From the bottom of column 16 a liquid stream is withdrawn by means of line 25, this stream being split into stream 26 which is circulated through reboiler 27 and line 28, and stream 29 which has the following composition and flows at the following rates in pounds per hour: chlorine, 0.4; boron trichloride, 3710; and phosgene, 29. This stream has a temperature of 160° F. and is at a pressure of 50 p.s.i.g. From line 29 this stream of essentially pure boron trichloride enters pump 30 and is transferred by means of line 31 into distillation column 32, from the top of which vapors are withdrawn by means of line 33 and enter condenser 34. The liquid condensed in this condenser passes through line 35 and this stream is split into reflux flowing through line 36 and product flowing through line 37. The material flowing through line 37 is essentially pure boron trichloride flowing at the rate of 3710 pounds per hour. It has a temperature of 150° F. and is at a pressure of 50 p.s.i.g. Bottoms from column 32 are transferred by means of line 38 for appropriate disposal.

Returning now to the operation of spray tower 1, from the bottom thereof through line 39 there is withdrawn the following mixture at the following rate in pounds per hour; boric oxide, 10,824; chlorine, 6408; and boron trichloride, 97,000. This mixture has a temperature of approximately 20° F. This mixture is admixed with a stream flowing through line 40 and then passes by means of line 41 into pump 42. From pump 42 the mixture is transferred by means of line 43 to cooler 44 and thence by means of line 45 into scrubber recycle crystallizer 46 equipped with stirrer 47. The mixture flowing through line 45 is composed of the following materials flowing at the following rate in pounds per hour: Boric oxide, 21,647; chlorine, 12,816; and boron trichloride, 194,000. This mixture is at a temperature of approximately 5° F.

In addition of stream 40, there is withdrawn from the bottom of crystallizer 46 stream 48 which is composed of the following ingredients flowing at the following rates in pounds per hour: boric oxide, 10,824; chlorine, 6,408; and boron trichloride, 97,000. This stream has a temperature of approximately 5° F. From line 48 the mixture enters pump 49 and from there it is transferred by means of line 50 into scrubber recycle filter 51, this being a continuous filter. Through line 52 there is removed a mixture of 24 pounds of boric oxide per hour, 2 pounds of chlorine per hour and 22 pounds of boron trichloride per hour. This mixture is introduced into a solids storage tank 53 wherein volatile products are flashed off by heating, 24 pounds per hour of boric oxide being removed by means of line 54 for use in the preparation of further quantities of boron trichloride by reaction with carbon and chlorine. From storage tank 53 there is removed overhead by means of line 55 a gaseous mixture composed of 2 pounds of chlorine per hour and 22 pounds of boron trichloride per hour, the mixture having a temperature of 15° F. This mixture passing through line 55 enters condenser 56, from which liquid passes by means of lines 57 and 58 into surge tank 59. Also from filter 51 and through line 60 there passes a filtrate which is combined with the material passing through line 57, the mixture flowing through line 58 being composed of the following materials flowing at the following rates in pounds per hour: chlorine, 6408; boron trichloride, 97,000; and boric oxide, 10,800. The mixture passing through line 58 is at a temperature of 5° F. Also into surge tank 59 there is introduced a stream through line 14, this stream being composed of the following materials flowing at the following rates in pounds per hour: chlorine, 235; boron trichloride, 1858; and phosgene, 14.

From the bottom of surge tank 59 through line 61 there is withdrawn a mixture of the following materials flowing at the following rates in pounds per hour: boric oxide, 10,800; chlorine, 6643; boron trichloride, 98,858; and phosgene, 14. The stream flowing through line 61 is at a temperature of 5° F. This stream enters pump 62 which serves to introduce the mixture into line 3.

It is claimed:

1. In the production of boron trichloride by reacting an oxygen-containing boron compound selected from the group consisting of boric oxides, boric acids and sodium borates with chlorine and carbon at an elevated temperature to produce a gaseous mixture comprising boron trichloride which upon cooling to a temperature below about 250° C. deposits solids which consist primarily of a boron trichloride-boric oxide complex, the step of spraying said gaseous mixture at a temperature above about 250° C. with a liquid comprising essentially boron trichloride whereby boric oxide solids-forming constituents of said gaseous mixture are removed therefrom.

2. The method of claim 1 wherein said oxygen-containing boron compound is boric acid.

3. The method of claim 1 wherein said liquid consists essentially of 5 to 15 percent by weight of boric oxide, 2 to 10 percent by weight of chlorine and 75 to 95 percent by weight of boron trichloride.

References Cited in the file of this patent
UNITED STATES PATENTS

| | | |
|---|---|---|
| 1,350,932 | Moore | Aug. 24, 1920 |
| 2,097,482 | Weber | Nov. 2, 1937 |
| 2,311,466 | Pechukas | Feb. 16, 1943 |
| 2,594,370 | Warburton | Apr. 29, 1952 |